UNITED STATES PATENT OFFICE.

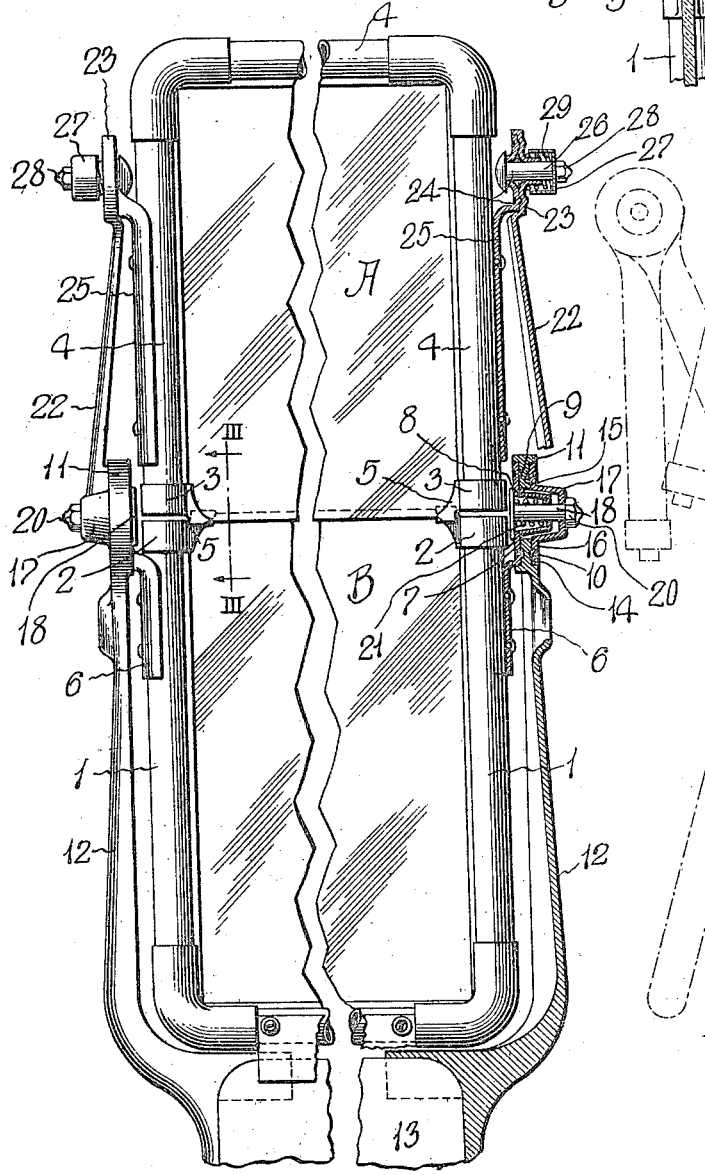
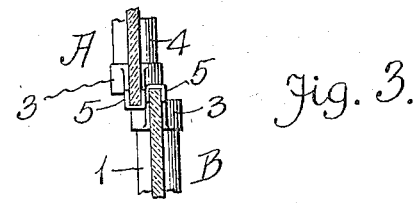
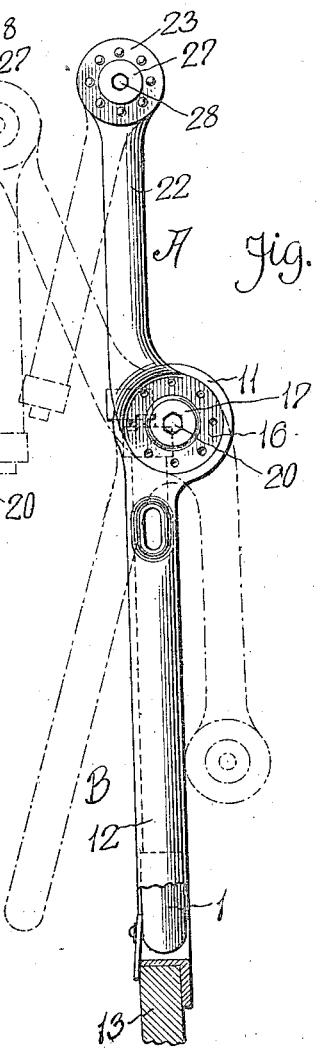

JOSEPH F. BUHR, OF DETROIT, MICHIGAN.

WIND-SHIELD.

1,255,705.  Specification of Letters Patent.  Patented Feb. 5, 1918.

Application filed January 24, 1916. Serial No. 73,824.

*To all whom it may concern:*

Be it known that I, JOSEPH F. BUHR, a citizen of the United States of America, residing at Detroit, in the county of Wayne and State of Michigan, have invented certain new and useful Improvements in Wind-Shields, of which the following is a specification, reference being had therein to the accompanying drawings.

Ford automobiles are ordinarily equipped with wind-shields having lower portions or sections fixed to the dash of the automobile and consequently the lower portions or sections of the windshields cannot be adjusted for ventilating purposes. To utilize the same glass supporting frames of a Ford windshield and provide means whereby either frame may be adjusted for ventilating purposes, is the primary object of my invention, which is attained by using novel brackets, arms and interlocking frame connections, all of which are assembled for easy manipulation.

A further object of my invention is to provide sheet metal supports for the frames of a windshield, which permit of the frames being suitably adjusted and rigidly held in their adjusted positions to provide a desired degree of ventilation at the rear side of a windshield.

My invention will be hereinafter described and then claimed, and reference will now be had to the drawing, wherein Figure 1 is a rear elevation of a windshield, partly broken away and partly in section;

Fig. 2 is a side elevation of the same, partly broken away and partly in section, showing the frames of a windshield in adjusted positions by dotted lines, and Fig. 3 is a vertical sectional view of a portion of the windshield taken on the line III—III of Fig. 1.

In the drawing, A and B generally denote the upper and lower frames of a windshield, and the side rails 1 of the frame B have caps 2 confronting caps 3 on the ends of the side rails 4 of the windshield frame A. The caps 2 and 3 have stirrups or yokes 5 engaging and holding the bared edges of the glass or transparent plates mounted in the frames A and B. With the frame A set slightly in advance of the frame B, the bared edges of the glass or transparent plates are adapted to overlap, as shown in Fig. 3, and the frame A may be easily moved in advance of the frame B or folded into parallelism with said frame, as shown by dotted lines in Fig. 2.

The rails 1 of the frame B have hangers 6, adjacent the caps 2, terminating in circular heads 7. The heads 7 have concentric apertured cupped portions 8 and contiguous to the peripheral edges of the heads are circumferentially disposed depressions in the inner side of said head, providing teeth or protuberances 9 on the outer sides of the heads. The heads 7 extend into annular recesses 10 in the inner faces of stationary heads 11 at the upper ends of brackets 12, suitably secured to the upper edge of a dash 13, at the ends thereof. The outer sides of the heads 11 have annular recesses 14 and both sides of said heads have circumferentially disposed notches adapted to receive the teeth or protuberances 9 of the heads 7 and teeth or protuberances 15 on heads 16 having cupped portions 17. The cupped portions 17 receive the cupped portions 8 which extend through the openings in said stationary heads, and both the cupped portions 17 and 8 have concentric openings to receive bolts 18 which have the heads thereof engaging the heads 7. The protruding ends of the bolts 18 have nuts 20, and surrounding said bolts, within the cupped portion 8 are coiled compression springs 21 bearing against the cupped portions 8 of the heads 7 to hold the heads 7, 11 and 16 interlocked and in an adjusted position.

The heads 16 have tangentially disposed arms 22 and these arms are bent inwardly, as best shown in Fig. 1, with the upper ends thereof terminating in heads 23 to receive the heads 24 of hangers 25 secured to the rails 4 of the windshield frame A. The heads 23 and 24 are made somewhat similar to the heads 7, 11 or 16, to interlock, the heads 24 extending into the heads 23 to be adjustably held by bolts 26, cup washers 27, nuts 28, and springs 29.

The manner of suspending the hangers 25 in the arms 22 and the hangers 6 in the brackets 12 permit of the windshield frames A and B being swung at a desired angle, and since the set of arms 22 is held for adjustment at the upper ends of the stationary brackets 12, said arms can be shifted at an angle to support the windshield frame A, in a vertical plane parallel with the plane of the brackets 12 or in any desired position.

The interlocked heads constitute frictional slip joints and it is apparent that the springs 21 and 29 will allow certain of the heads to yield as the windshield frames A and B are manually adjusted to a desired angle for ventilating purposes or to provide a clear vision.

The ordinary Ford windshield has the lower frame thereof provided with fixed brackets secured to the dash, and I can use this same frame by simply removing the brackets and providing the lower edge of the frame with a weather strip.

As a matter of good construction, the brackets 12, arms 22, hangers 6 and 25, and the heads and washers are stamped from sheet metal possessing sufficient rigidity to provide a substantial support for the windshield frames, and these structural elements can be easily dipped and finished to harmonize with the metallic fittings of an automobile.

One embodiment of my invention has been illustrated but it is to be understood that the structural elements are susceptible to such variations and modifications as fall within the scope of the appended claim.

What I claim is:—

The combination with upper and lower windshield frames, of brackets having heads, hangers on the lower frame provided with conical heads extending through the bracket head, arms having lower conical heads to receive the hanger heads, yieldable means in the hanger heads interlocking the conical heads of said arms and the heads of said hangers and brackets, heads at the upper ends of said arms, hangers on the upper frame having heads, and yieldable means interlocking the heads of the last mentioned hangers with the heads of the upper ends of said arms.

In testimony whereof I affix my signature in presence of two witnesses.

JOSEPH F. BUHR.

Witnesses:
ANNA M. DORR,
KARL H. BUTLER.